United States Patent [19]
Wallace et al.

[11] Patent Number: 5,172,743
[45] Date of Patent: Dec. 22, 1992

[54] RETRACTABLE AWNING WITH IMPROVED LOCKING MECHANISMS

[75] Inventors: Howard Wallace, Redmond; Robert Bridges; Anthony Grasso, both of Seattle, all of Wash.; Greg Marting, Aptos; Kurt Solland, Long Beach, both of Calif.

[73] Assignee: Carter Shades, Inc., Seattle, Wash.

[21] Appl. No.: 801,792

[22] Filed: Dec. 3, 1991

[51] Int. Cl.[5] .............................................. E04F 10/06
[52] U.S. Cl. ......................................... 160/67; 160/71
[58] Field of Search ...................... 160/67, 66, 69, 70, 160/71, 78, 79, 80, 22; 135/89

[56] References Cited

U.S. PATENT DOCUMENTS

| | | | |
|---|---|---|---|
| 3,918,510 | 11/1975 | Hayward | 160/22 X |
| 4,117,876 | 10/1978 | Bennett | 160/67 |
| 4,508,126 | 4/1985 | Everard . | |
| 4,530,389 | 7/1985 | Quinn et al. | 160/67 X |
| 4,719,954 | 1/1988 | Curtis et al. | 160/67 |
| 4,819,706 | 4/1989 | Quinn | 160/80 X |

Primary Examiner—David M. Purol
Attorney, Agent, or Firm—Christensen, O'Connor, Johnson & Kindness

[57] ABSTRACT

A retractable awning for attachment to a structure, such as the side of a recreational vehicle, is provided. The awning includes a shade adapted to be moved from a furled position in which the awning is secured adjacent to the vehicle to an unfurled position in which the shade provides protection from sun and rain. The awning has an upper rafter bar and a lower upright support and a locking structure for locking the rafter bar in an extended position. This locking structure can be remotely released through the use of a release arm. The awning also includes a locking structure for locking the rafter bar to the upright support. This locking structure includes a locking pin located on the rafter bar and a locking keeper slidably mounted on the upright. The upright comprises a first channel member slidably mounted within a second channel member through the use of a slider structure. The slider structure comprises a low friction surface, such as an ultra-high molecular weight polyethylene material. A handle is operatively mounted on the upright and includes a pushbutton release structure. Depressing the pushbutton allows the upright to be lengthened or shortened, thereby adjusting the height of the awning shade.

20 Claims, 8 Drawing Sheets

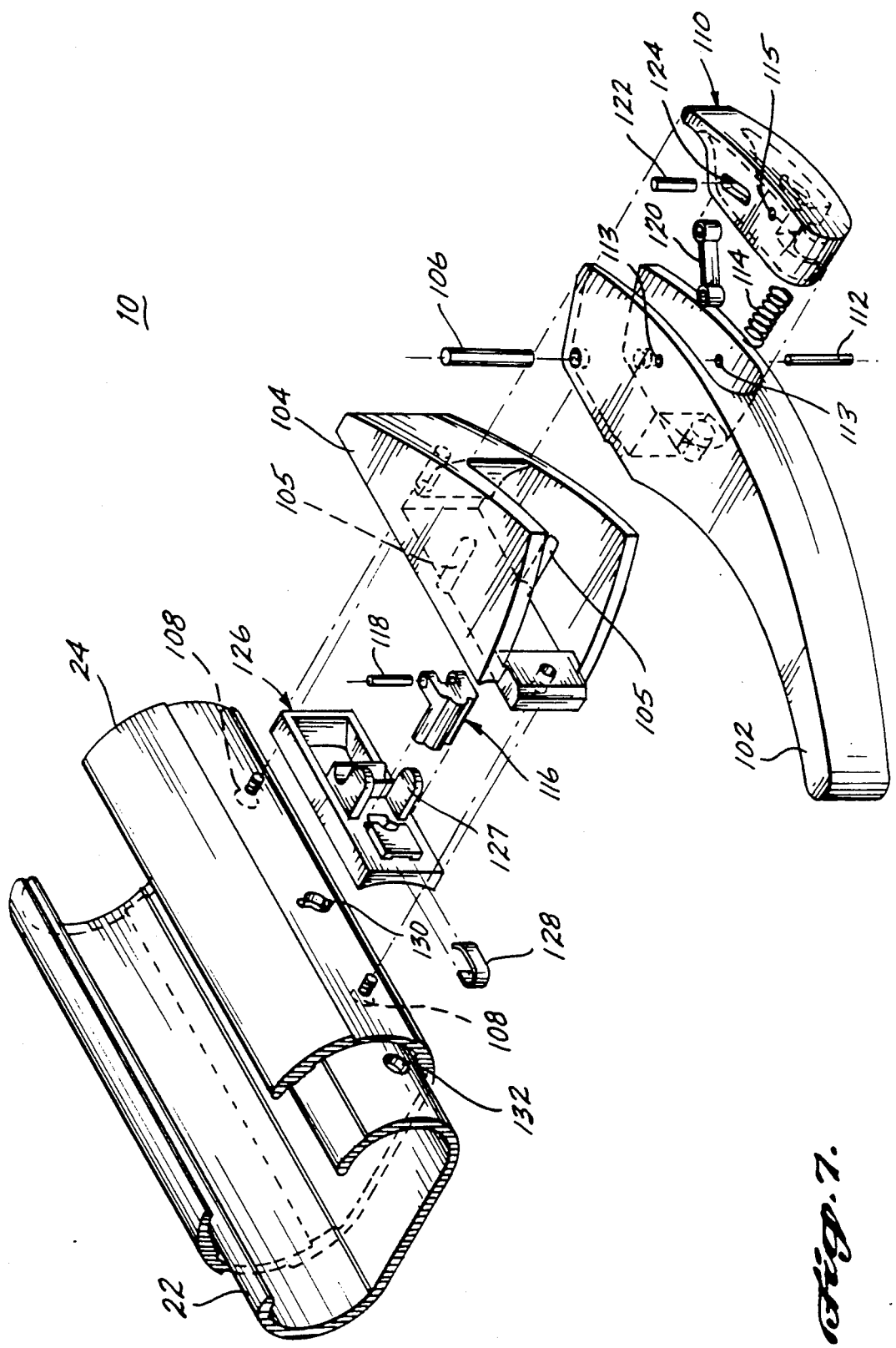

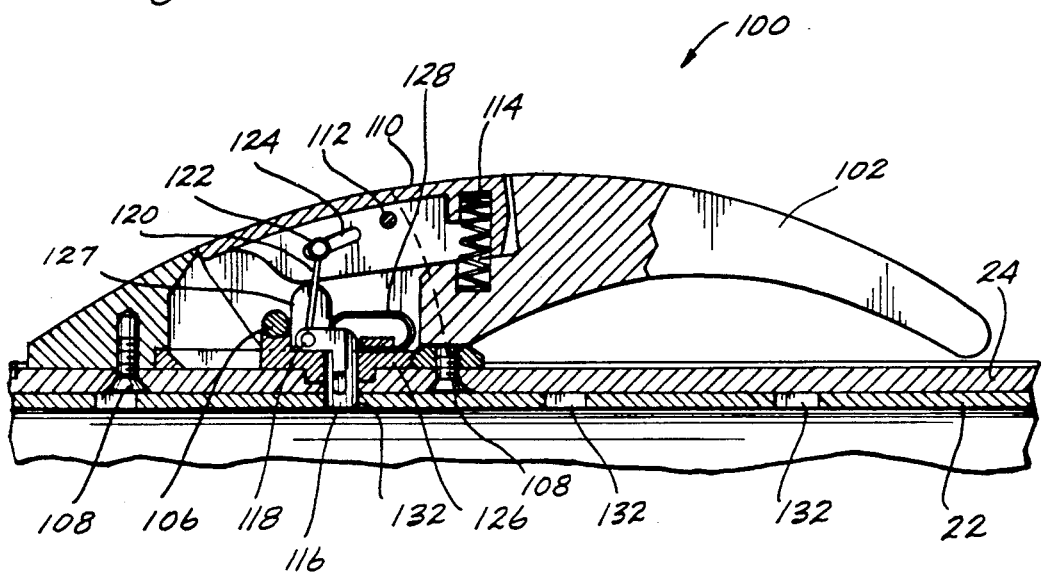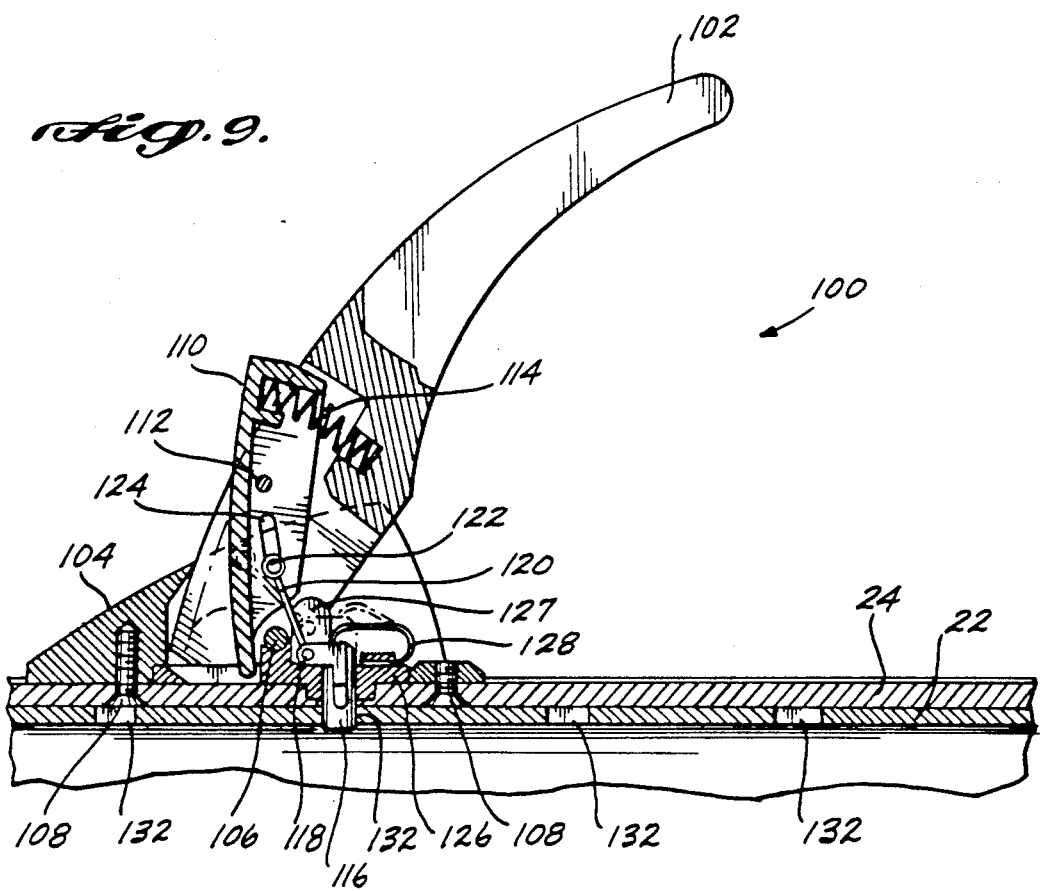

RETRACTABLE AWNING WITH IMPROVED LOCKING MECHANISMS

FIELD OF THE INVENTION

This invention relates to retractable awnings for attachment to the side of a recreational vehicle.

BACKGROUND OF THE INVENTION

Retractable awnings have been in use for several years. They are often attached to the side of a recreational vehicle, such as a trailer or a motor home. When extended, the awning provides protection from weather elements, such as sun or rain. The awnings are capable of being secured adjacent to the side of the vehicle during transportation and can then be extended out from the side of the vehicle upon stopping.

Prior art retractable awnings have a number of shortcomings. The locking mechanism used to lock the awning supports to the side of the trailer are often cumbersome to use or easily damaged. Some prior art locking mechanisms project out from the awning supports. Due to the nature of the recreational vehicles, this often results in damage to the locking mechanism during transportation.

Most prior art awnings use an upright support with two telescoping members that can be slidably extended in order to adjust the height of the awning shade. In most designs, the two telescoping members are metal tubes or channels that slide within each other. The two telescoping members are free to contact each other while sliding; this results in scratching and gouging of the surface finish of the members. This contact also creates an unpleasant grating noise and feel as the members slide with respect to one another and can result in sticking or binding between the two members.

Most awnings have a handle located on the awning upright supports. This handle is used to unlock the two telescoping members and slidably extend the members in order to raise the height of the awning shade. The telescoping members are unlocked by pulling the handle away from the members and locked by pushing the handle toward the members. This system is clumsy to use and requires the use of both of the user's hands. One hand is required to hold the upright in its extended position, while the other hand is used to push the handle toward the uprights. Furthermore, if the user does not carefully lock the members together once they are extended, the members may freely slide within one another, possibly damaging the awning.

One prior art awning design uses an upper rafter support which includes two pivotally connected arms. Once the awning is extended, the two arms lock in an extended position to ensure that the awning shade remains extended. These arms must be manually unlocked prior to retracting the awning. Often, the awning is mounted on the side of the recreational vehicle in such a way that it is difficult for the average user to reach and unlock the arms.

SUMMARY OF THE INVENTION

One embodiment of the present invention comprises an awning frame which includes a shade that is movable from a furled position to an unfurled position. The frame includes rafter bar means and upright means. The upright means is formed of two pieces which are adapted to slide longitudinally with respect to each other. Furthermore, the frame includes locking means associated with the upright means to prevent the pieces of the upright means from sliding longitudinally with respect to each other. The frame also includes a locking means that interconnects and holds the upright means to the rafter bar means when the shade is in the furled position.

According to other aspects of the invention, the rafter bar means includes first and second pivotally connected arms. The rafter bar means also includes locking means for preventing the first and second arms from pivoting relative to each other when the shade is in the unfurled position. The locking means can be unlocked using a long handle release means shaped to engage the locking means, thus preventing the user from straining to unlock the rafter bar means.

According to other aspects of the invention, the two pieces of the upright means slide longitudinally with respect to each other on slider means. The slider means comprises a longitudinally extending low friction surface formed of a low friction material such as an ultra-high molecular weight polyethylene material. This prevents the unpleasant grating noise and feel present in the prior art and reduces binding between the two pieces.

In yet another aspect of the invention, a handle is operatively mounted on the upright means. The handle has a pushbutton that is flush with the handle when the handle is in a first non-extended position and which protrudes from the handle when the handle is in an extended position. Depressing the pushbutton unlocks the upright means and allows the pieces of the upright means to slide with respect to each other. The handle also has a locking member which is connected to the pushbutton. When the pushbutton is depressed, the locking member moves in a direction away from the upright means and allows the pieces of the upright means to slide longitudinally. When the pushbutton is released, the locking member moves in a direction toward and engages the upright means. This prevents the pieces of the upright means from sliding longitudinally with respect to each other. This aspect of the present invention reduces the chance of uncontrolled sliding of the pieces of the upright means, thus reducing possible damage to the awning.

In accordance with another aspect of the present invention, the awning includes a locking pin located on the rafter bar means and keeper means slidably connected to the upright means. The keeper means engages the locking pin when the keeper means is in a locked position, thus holding the upright means to the rafter bar means and preventing unintentional extension of the awning frame.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings.

FIG. 7 is an exploded view of the handle of FIG. 1.

FIG. 8 is a cross section of the handle of FIG. 7.

FIG. 9 is a cross section of the handle of FIG. 7 in its extended position.

DETAILED DESCRIPTION OF THE PREFERRED EMBODIMENT

Figure 1:
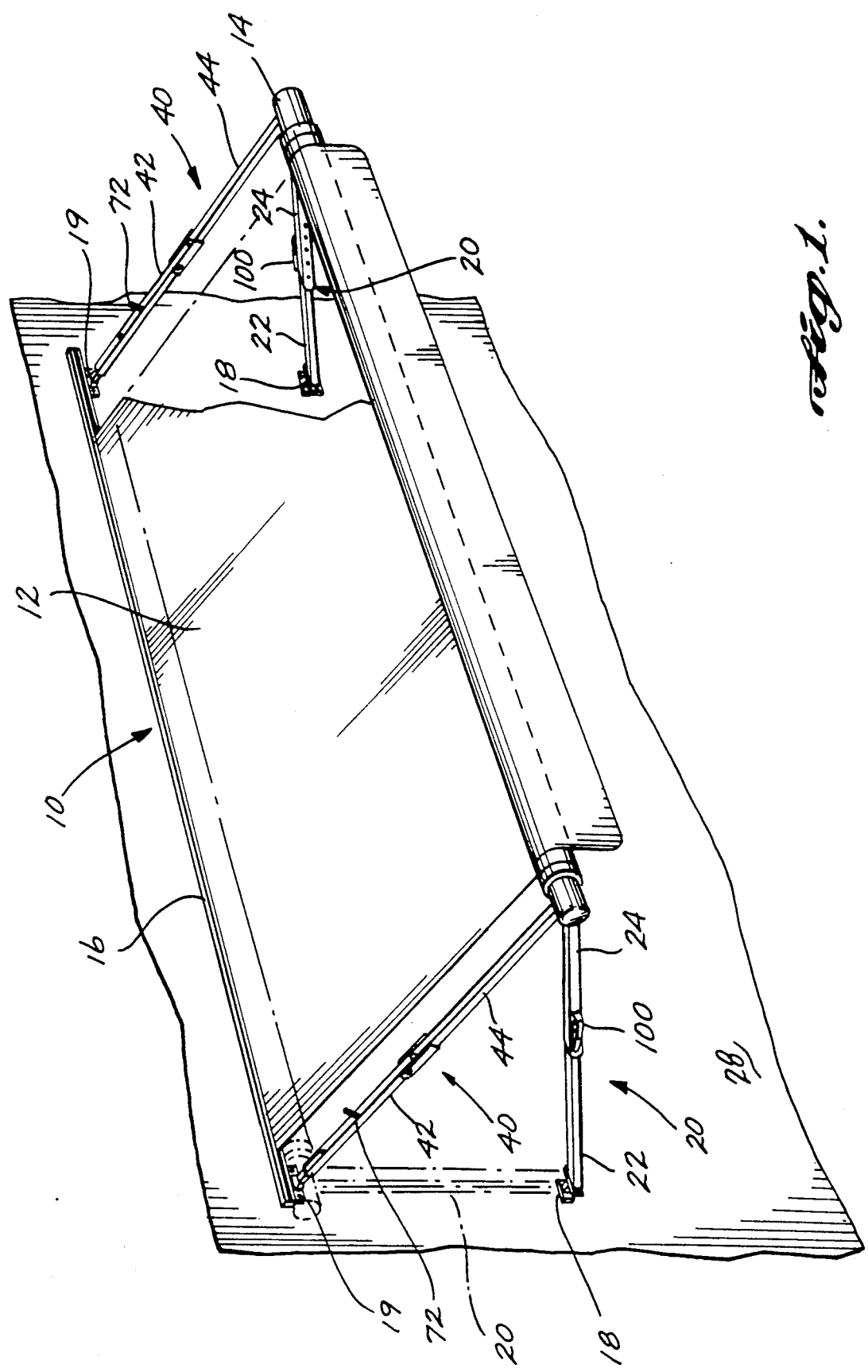
FIG. 1 is a perspective view of a retractable awning of the present invention.

FIG. 1 shows a retractable awning 10 according to the present invention. The retractable awning 10 includes a frame having two upper rafter support members or rafter bars 40, two upright support members or uprights 20 and a roller 14. One end of each upright 20 and each rafter bar 40 are attached to the side of a recreational vehicle 28 through the use of brackets 18 and 19, respectively. Recreational vehicles include trailers, motor homes and similar vehicles. The distal end of each upright 20 and each rafter bar 40 are pivotally attached to roller 14. Awning 10 also includes a fabric or similar shade 12 that is attached to trailer 28 along one edge through the use of an anchor bar 16 and is attached along an opposite edge to roller 14.

Awning 10 is capable of moving from an extended position in which the frame extends outward from the recreational vehicle 28 and the shade 12 is unfurled (FIG. 1) to a retracted position (shown in phantom in FIG. 1) in which the shade 12 is furled on roller 14 and the frame is secured to the side of the vehicle. In the extended position, shade 12 is adapted to provide shade or protect from rain.

Each awning upright 20 is composed of a first channel member 22 and a second channel member 24. In the preferred embodiment, channel members 22 and 24 are C-shaped in cross section (FIG. 2) and fabricated from a suitable durable material, such as aluminum or a plastic composite material. The C-shaped cross sections of channel members 22 and 24 allow the rafter bar 40 to move into the channel members when the awning 10 is in its retracted position, as described below.

Figure 2:
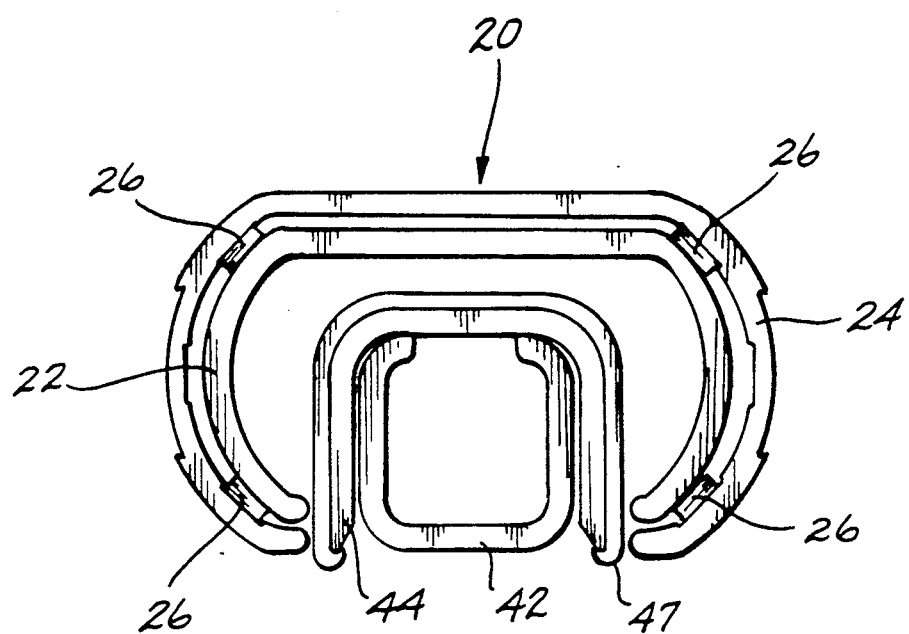
FIG. 2 is a cross section of the upright of the awning of FIG. 1.

As shown in FIG. 2, first channel member 22 is slidably mounted within second channel member 24 through the use of four sliding surfaces or tapes 26. Sliding tapes 26 are spaced within and attached to second channel member 24 such that the first channel member 22 is centered within the second channel member 24 (FIG. 2). Sliding tapes 26 extend the length of the second channel member 24 and are formed of a material which has a high resistance to abrasion and a low coefficient of friction. The preferred embodiment uses a tape formed from ultra-high molecular weight polyethylene an example of which is sold under the trademark UL-TRA/WEAR® by The Polymer Corporation. Another suitable material could be a Teflon ™ tape.

Sliding surfaces or tapes 26 allow first channel member 22 to slide freely within second channel member 24. This eliminates the unpleasant grating noise and feel present in the prior art and reduces problems associated with sticking or binding between the two channel members 22 and 24. The sliding tapes 26 also prevent the channel members from directly contacting each other when the upright is extended. This prevents one of the channel members from damaging the surface finish on the other channel member.

Figure 3:
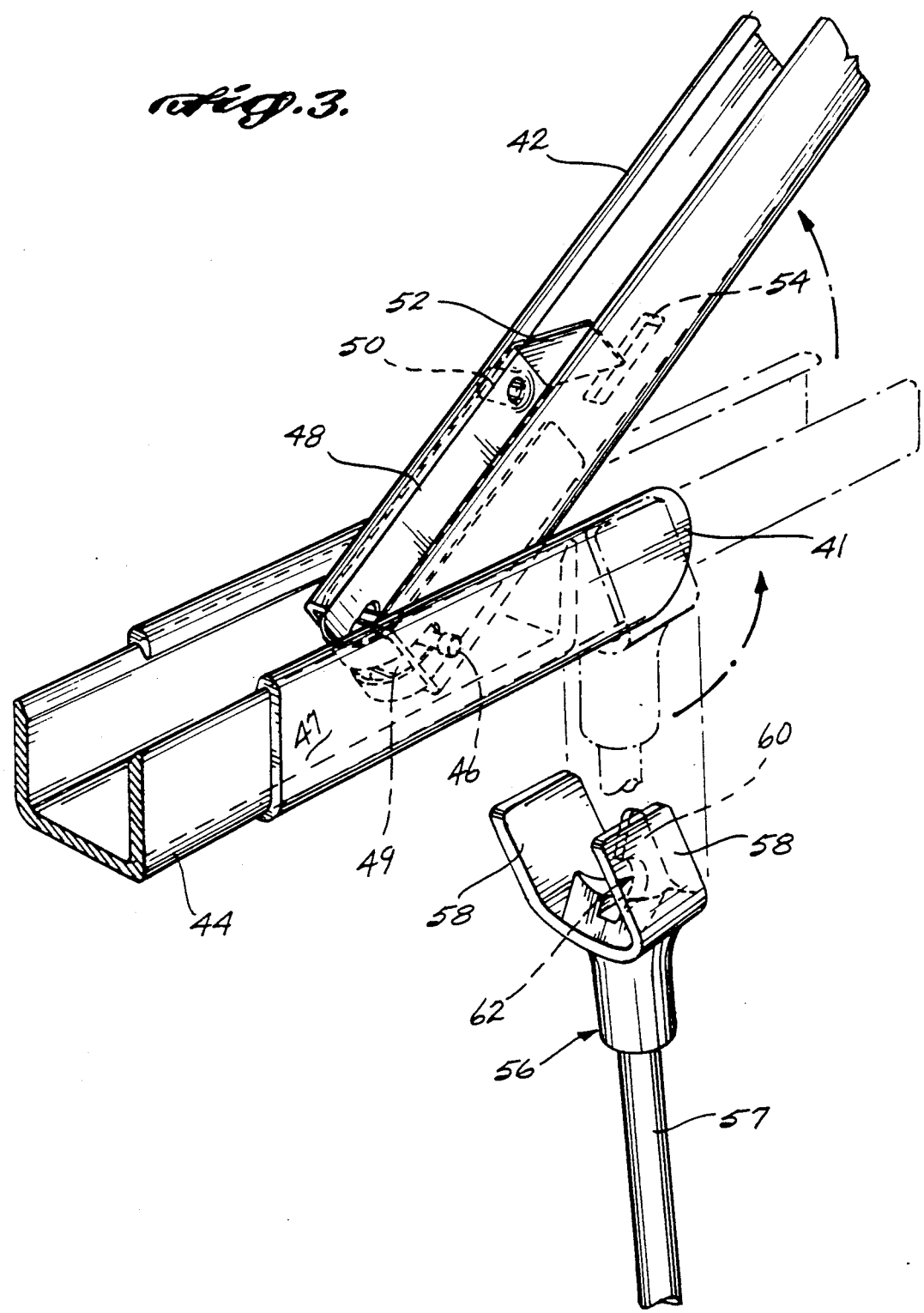
FIG. 3 is an enlarged view showing the details of the connection between the first arm and second arm of the rafter bar of FIG. 1.
Figure 4:
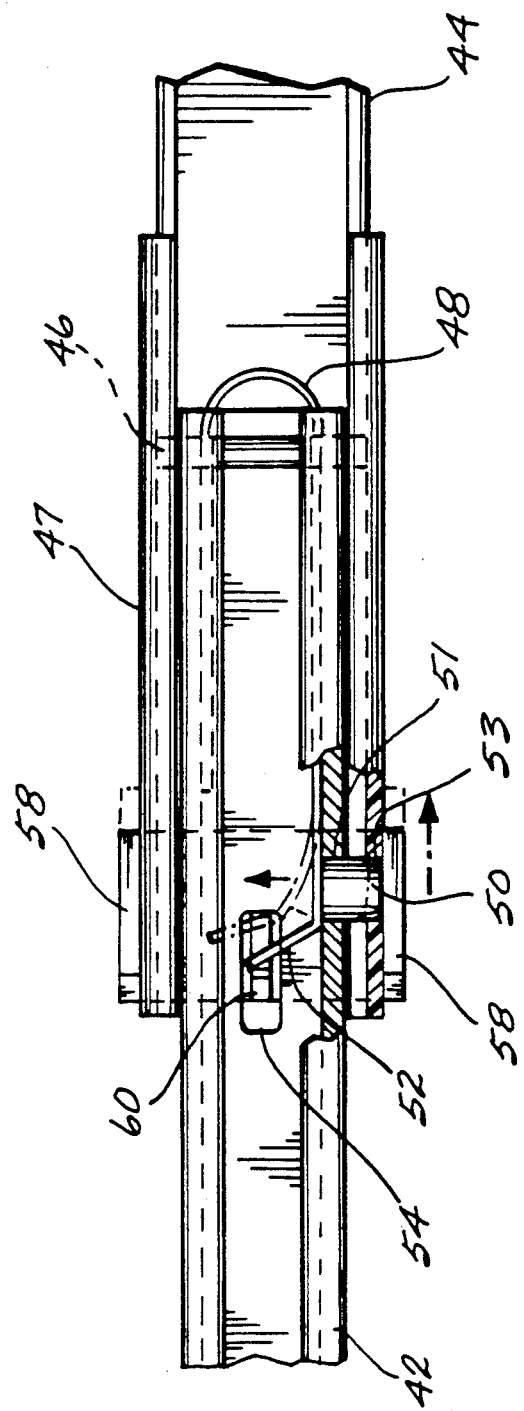
FIG. 4 is a top view of the rafter bar connection shown in FIG. 3.

As shown in FIG. 1, each rafter bar 40 includes a first arm 42 and a second arm 44. In the embodiment shown, first and second arms 42 and 44 are C-shaped channel members (FIG. 3) formed from a suitable material capable of withstanding exposure to weather elements, such as aluminum or a plastic composite material. FIGS. 3 and 4 are enlarged views showing the details of the connection between first arm 42 and second arm 44. First arm 42 is pivotally mounted to second arm 44 through the use of pivot pin 46. Upon extending awning 10, first arm 42 pivots within second arm 44 until first arm 42 and second arm 44 are longitudinally aligned. At this time, first arm 42 is locked within second arm 44 through the use of a retaining spring 48. This prevents the first and second arms 42 and 44 from pivoting relative to each other.

Retaining spring 48 is generally a U-shaped spring having a cutout 49 at one end. Spring 48 is placed within first arm 42 such that cutout 49 engages pivot pin 46. This prevents the retaining spring 48 from moving longitudinally out the end of first arm 42. Retaining spring 48 also includes a retaining pin 50 (FIGS. 3 and 4) which extends normal to the surface of retaining spring 48. The retaining spring 48 locks first arm 42 within second arm 44 by biasing retaining pin 50 through holes 51 and 53 located in the sides of first and second arms 42 and 44, respectively. When awning 10 is extended, first and second arms 42 and 44 are aligned and retaining spring 48 is in a locked position as shown in FIG. 4. In this position, retaining pin 50 extends through holes 51 and 53 in first and second arms 42 and 44. This prevents the first and second arms from pivoting on pivot 46. Retaining spring 48 also includes a release arm 52 which extends diagonally across first arm 42 adjacent slot 54 in the bottom of first arm 42.

Release arm 52 is used to release retaining spring 48 and allow first and second arms 42 and 44 to pivot on pivot pin 46. Retaining spring 48 is released through the use of a remotely operated release arm or rafter claw 56 as shown in FIG. 3. Rafter claw 56 comprises two guides 58 located on opposite sides of a center arm 60 all of which are mounted on a handle member 57. Handle member 57 is of sufficient length to allow a user to easily reach the rafter bar 40 as will be described hereafter.

In operation, a center arm 60 of rafter claw 56 is inserted into slot 54 in first arm 42 as shown in FIG. 4 and in phantom in FIG. 3. Guides 58 slide over opposing surfaces of second arm 44 while arm 60 extends through slot 54 in first arm 42. As shown in FIG. 4, arm 60 extends through slot 54 and contacts release arm 52. After inserting the center arm 60 of rafter claw 56 into slot 54, the user presses forward on rafter claw 56 in the direction shown by the arrow in FIG. 3. This causes arm 60 of the rafter claw 56 to press on release arm 52 in the direction shown by the arrow in FIG. 4. Release arm 52 is moved to the position shown in phantom in FIG. 4. As release arm 52 is moved, retaining spring 48 deforms withdrawing retaining pin 50 out of hole 53 in the second arm 44. This allows first and second arms 42 and 44 to pivot on pivot pin 46.

Arm 60 is formed with a cutout 62 (FIG. 3). Cutout 62 allows arm 60 to engage the edge of slot 54 after the rafter claw 56 is pressed forward. This allows the user to pull down on the second arm 44 while retaining pin 50 is withdrawn from hole 53. This releases retaining spring 48 and allows first arm 42 to pivot within second arm 44.

The use of the rafter claw 56 allows the user to release first and second arms 42 and 44 without stretching overhead and unlocking the arms. This allows for easier operation and prevents the user from having to strain to unlock the first and second arms.

Second arm 44 also includes a cover 47 attached to one end. Cover 47 is formed of a protective material such as a plastic or rubber. Cover 47 has a rounded end 41 that helps prevent a user from pinching his fingers between first and second arms 42 and 44. Cover 47 covers second arm 44 and thus helps protect the end of the second arm from damage and also helps prevent the second arm from scratching or damaging the first arm 42.

Figure 5:
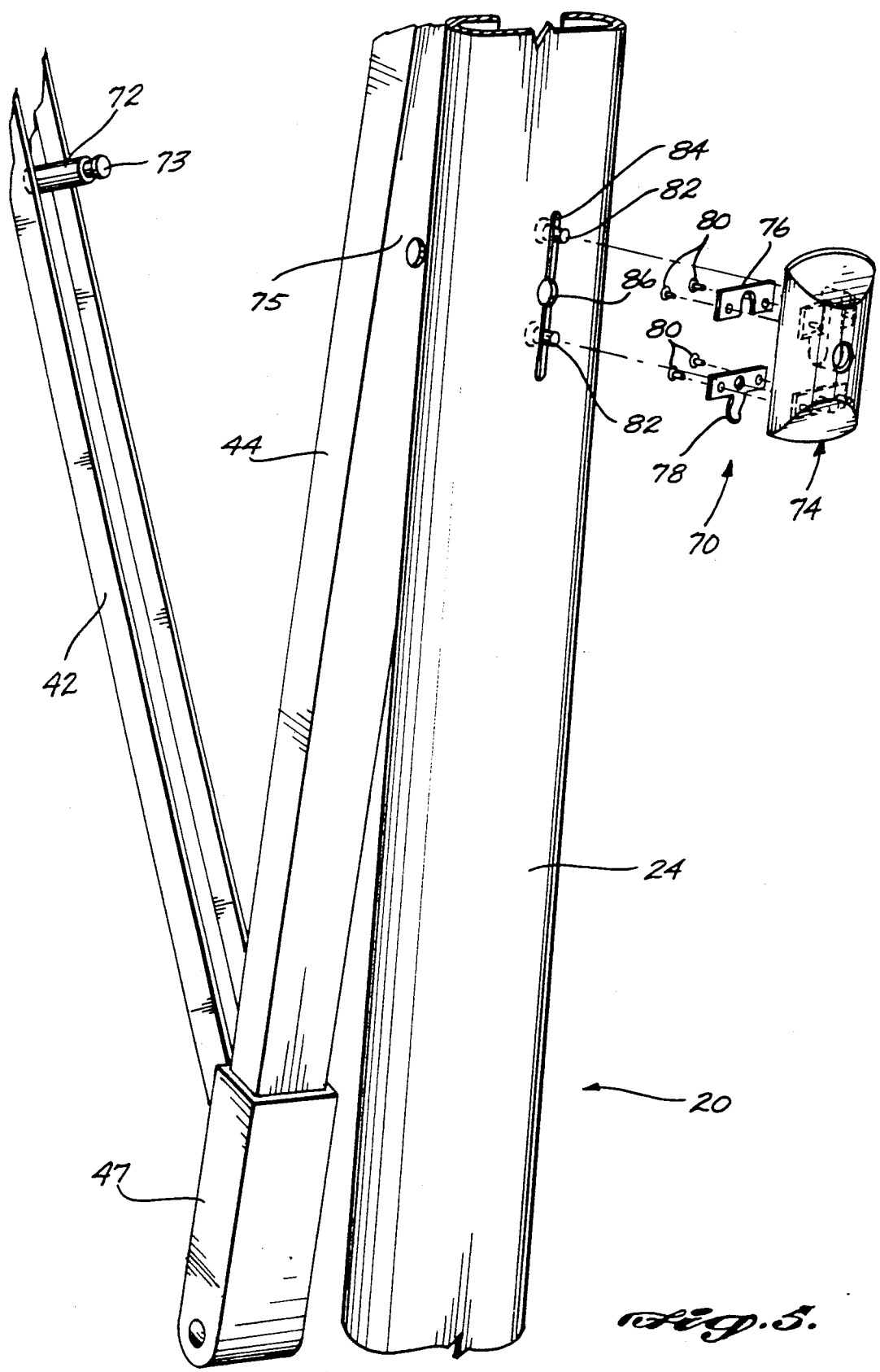
FIG. 5 is an exploded view of the travel lock of the awning of FIG. 1.

During retraction of awning 10, an operator uses the rafter claw 56 to release the retaining spring 48 on both rafter bars 40. This allows first and second arms 42 and 44 to pivot and fold inward allowing roller 14 to move toward trailer 28. Roller 14 includes a conventional spring loaded retraction system (not shown) that furls shade 12 upon roller 14 as the roller moves toward the trailer 28. As shown in FIG. 5, as first and second arms 42 and 44 pivot, they move toward uprights 20. The first and second channel members 22 and 24 of upright 20 are formed such that as the awning 10 moves toward its retracted position, first and second rafter arms 42 and 44 fold into first and second channel members 22 and 24, as shown in FIG. 2.

FIG. 2 is a cross section of the rafter bar 40 and the upright 20 when the awning is in the furled position. This cross section is taken at the location where the cover 47 is located on the second arm 44. Besides protecting the second arm, the cover 47 helps to center the first and second rafter arms 42 and 44 within the first and second channel members 22 and 24.

Figure 6:
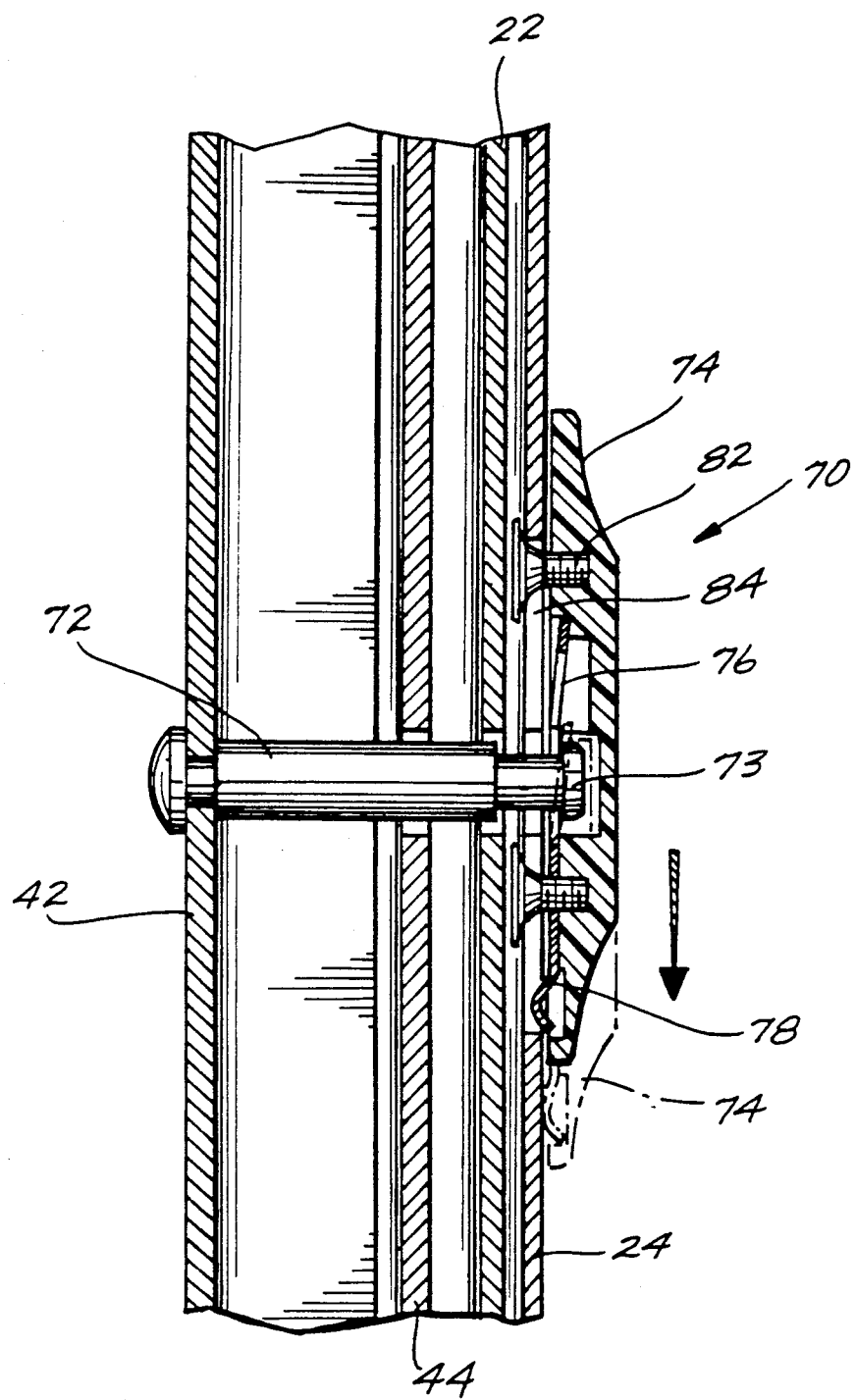
FIG. 6 is a cross section of the travel lock of FIG. 5.

Once awning 10 is moved to a retracted position (shown in phantom in FIG. 1), rafter bars 40 are locked to uprights 20. This prevents the awning 10 from extending during transportation. As first and second arms 42 and 44 move within upright 20 (FIG. 2), a locking pin 72 mounted in first arm 42 (FIG. 5) extends through a hole 75 in the second arm 44 and a hole 86 in first and second channel members 22 and 24. Locking pin 72 also extends into and engages a travel lock 70. The cover 47 helps to center the first and second arms 42 and 44 with the channel members as described above; this helps to ensure that the locking pin 72 is in the proper position to communicate with the hole 86 when the awning is moved to the retracted position. The travel lock 70 is a locking mechanism that is slidably mounted within outer channel member 24 as best shown in FIG. 6.

Travel lock 70 includes a locking keeper 74 to which a retainer 76 and a spring 78 are fastened with fasteners 80. Locking keeper 74 is slidably mounted to second channel member 24 through the use of two fasteners 82 located in a slot 84 in channel member 24. When awning 10 is retracted, locking pin 72 extends into locking keeper 74 as shown in FIG. 6. To lock travel lock 70, locking keeper 74 is moved downwardly in the direction indicated by the arrow in FIG. 6. This causes notched retainer 76 to engage head 73 on locking pin 72. Retainer 76 is made of a resilient material such as spring steel so that the retainer securely maintains travel lock 70 in a first or locked position (shown in phantom in FIG. 6).

Travel lock 70 also includes a spring plate 78. Spring plate 78 extends into slot 84 when travel lock 70 is in the unlocked position (FIG. 6). This prevents travel lock 70 from inadvertently sliding into its locked position, thus ensuring that as awning 10 is moved to its retracted position, locking pin 72 will be able to move freely into travel lock 70. Travel lock 70 allows the user to easily lock the awning upright 20 to the rafter bar 40, thus preventing their movement while recreation vehicle 28 is in motion. The very low profile of travel lock 70 reduces the chance of damage to the travel lock 70 during movement of recreational vehicle 28. Travel lock 70 is also very easy to lock and unlock unlike the prior art.

When awning 10 is in its extended position, the height of shade 12 can be raised or uprighted through the use of uprights 20 (FIG. 1). As discussed, upright 20 comprises a first channel member 22 slidably mounted within a second channel member 24 (FIGS. 1 and 2). By sliding channel member 24 with respect to channel member 22, upright 20 can be lengthened or shortened thus raising or lowering the height of shade 12. A handle 100 located on each upright 20 is used to lengthen or shorten each upright and to lock each upright at the desired height. Channel member 22 has a plurality of holes 132 spaced over its length. Holes 132 are engaged by handle 100 in order to lock upright 20 at the desired length, as discussed in the following paragraphs.

FIG. 7 shows an exploded view of handle 100. In the preferred embodiment shown, handle 100 comprises a support 104 which is attached to second channel member 24 through the use of two fasteners 108. A lever 102 is pivotally mounted within support 104 through the use of a pivot pin 106. The opposite ends of pivot pin 106 are retained within two opposed grooves 105 located in support 104. Pivot pin 106 allows lever 102 to move from a first or horizontal position as shown in FIG. 8, to an extended position in which lever 102 extends outwardly from second channel member 24 as shown in FIG. 9. A thumb actuated pushbutton 110 is pivotally mounted within handle 100 through the use of a pivot pin 112. Pivot pin 112 extends through holes 113 in handle 100 and through a hole 115 in button 110.

A spring 114 is positioned between button 110 and lever 102 and is held in place in cooperating recesses in lever 102 and button 110 (FIGS. 8 and 9). Spring 114 biases button 110 to pivot away from lever 102. Handle 100 also includes a locking member 116. Locking member 116 is mounted within a retainer 126 through the use of a spring 128 as shown in FIGS. 8 and 9. Retainer 126 also has a ledge 127. When lever 102 is in its first position, as shown in FIG. 8, ledge 127 contacts button 110 and prevents button 110 from being biased away from lever 102 by spring 114.

Locking member 116 is also connected to button 110 through the use of an arm 120. One end of arm 120 is pivotally connected to locking member 116 through the use of a pivot pin 118. The other end of arm 120 is pivotally connected to button 110 through the use of a pivot pin 122. Pivot pin 122 is mounted within a slot 124 in button 110. In operation, when lever 102 is in its horizontal position (FIG. 8) locking member 116 extends through a cutout 130 in channel member 24 and through a hole 132 in channel member 22. In this position, locking member 116 prevents channel member 22 from sliding with respect to channel member 24. Locking member 116 is biased into hole 132 by spring 128.

In order to release locking member 116, lever 102 is first pulled up away from channel member 24. This extended position is shown in FIG. 9. As lever 102 is extended, spring 114 biases button 110 such that button 110 pivots on pivot 112 to protrude from lever 102. Spring 114 is able to bias button 110 away from lever 102 because as lever 102 is extended, button 110 is no longer limited by ledge 127.

As lever 102 is extended, locking member 116 remains in its locked position where member 116 extends through hole 132 and channel member 22 is locked within channel member 24. Extending lever 102 does not move locking member 116 because pivot pin 122 slides within slot 124 as lever 102 is extended. FIG. 9 shows lever 102 in its extended position with locking member 116 in its locked position. After extending lever 102, locking member 116 can be moved to its unlocked position (shown in phantom in FIG. 9) by depressing button 110. As button 110 is depressed with a user's thumb, it pivots on pivot pin 112. This causes arm 120 to pull up on locking member 116, thus moving locking member 116 out of hole 132. This allows channel member 22 to slide freely with respect to channel member 24. Locking 116 moves normal to the surface of second channel member 24 when button 110 is depressed. This action results in a smooth non-binding feel and release of locking member 116.

After extending lever 102 and depressing button 110, pulling up on lever 102 causes channel member 24 to slide over channel member 22 lengthening upright 20. Once upright 20 has been extended to the desired position, button 110 is released. This results in locking member 116 being biased by spring 128 into a hole 132 in channel member 22. This design prevents channel member 24 from accidentally sliding with respect to channel member 22. If handle 102 or button 110 is accidentally released, locking member 116 is biased into the closest hole 132 by spring 128. This prevents uncontrolled movement of the channel member 24, thus preventing possible damage to awning 10. Furthermore, the fact that button 110 is biased away from handle 102 upon extending handle 102 makes for easy operation of button 110. The handle 102 of the present invention allows the operator to unlock, extend, and lock the upright 20 through the use of a single hand. This feature is a great advantage over prior art designs which require the use of both hands.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An awning frame including a shade adapted to be moved between a furled and an unfurled position, the frame comprising:
    a) rafter bar means including
        i) first and second pivotally connected arms; and
        ii) locking means for preventing said first and second arms from pivoting relative to each other when the shade is in the unfurled position, and unlocking means for remotely unlocking said first and second arms such that said arms are free to pivot relative to each other;
    b) upright means formed of two pieces adapted to slide longitudinally with respect to each other;
    c) locking means associated with said upright means to prevent said two pieces from sliding longitudinally with respect to each other; and
    d) locking means adapted to interconnect and hold said upright means to said rafter bar means when said awning shade is in the furled position.

2. The awning frame of claim 1, wherein the unlocking means for remotely unlocking said first and second arms comprises a long handled release means shaped to engage the locking means associated with said first and second arms.

3. The awning of claim 1, wherein the upright means further comprises low friction longitudinally extending slider means located between said two pieces of the upright means such that one of said pieces slides with respect to the other piece without making direct contact therewith.

4. The awning of claim 3, wherein the slider means comprises a low friction surface formed of an ultra-high molecular weight polyethylene material.

5. The awning of claim 1, wherein the locking means associated with said upright means further comprises:
    (a) a handle operatively mounted on said upright means; and
    (b) a thumb actuated pushbutton means operatively connected to the handle such that depressing the pushbutton means unlocks the locking means associated with said upright means, thereby allowing said two pieces of the upright means to slide longitudinally with respect to each other.

6. The awning of claim 5, wherein the pushbutton means is operatively connected to the handle such that the pushbutton means is flush with the handle when the handle is in a first non-extended position, and such that the pushbutton means protrudes from the handle when the handle is moved to an extended position.

7. The awning of claim 1, wherein the locking means adapted to interconnect and hold said upright means to said rafter bar means further comprises a locking pin located on said rafter bar means and keeper means slidably connected to said upright means and adapted to engage the locking pin when the keeper is in a locked position, thereby holding said upright means to said rafter bar means.

8. An awning frame including a shade adapted to be moved between a furled and an unfurled position, the frame comprising:
    a) rafter bar means;
    b) upright means formed of two pieces adapted to slide longitudinally with respect to each other, the upright means including longitudinally extending low friction slider means located between said two pieces such that one of said pieces slides with respect to the other piece without making direct contact therewith;
    c) locking means associated with said upright means to prevent said two pieces from sliding longitudinally with respect to each other; and
    d) locking means adapted to interconnect and hold said upright means to said rafter bar means when said awning shade is in the furled position.

9. The awning of claim 8, wherein the slider means comprises a low friction surface formed of a low-friction material such as an ultra-high molecular weight polyethylene material.

10. The awning of claim 8, wherein the slider means comprises a plurality of low-friction surfaces located such that one of said pieces is substantially centered within the other said piece.

11. The awning of claim 8, wherein the locking means associated with said upright means further comprises:
    (a) a handle operatively mounted on said upright means; and (b) a thumb actuated pushbutton means operatively connected to the handle such that depressing the pushbutton means unlocks the locking means associated with said upright means, thereby allowing said two pieces of the upright means to slide longitudinally with respect to each other.

12. The awning of claim 8, wherein the pushbutton means is operatively connected to the handle such that the pushbutton means is flush with the handle when the handle is in a first non-extended position, and such that the pushbutton means protrudes from the handle when the handle is moved to an extended position.

13. The awning of claim 8, wherein the pushbutton means operatively connected to the handle such that the pushbutton means is flush with the handle when the handle is in a first non-extended position and such that the pushbutton means protrudes from the handle when the handle is moved to an extended position.

14. The awning of claim 8, wherein the locking means adapted to interconnect and hold said upright means to said rafter bar means further comprises a locking pin located on said rafter bar means and keeper means slidably connected to said upright means and adapted to engage the locking pin when in a locked position, thereby holding said upright means to said rafter bar means.

15. An awning frame including a shade adapted to be moved between a furled and an unfurled position, the frame comprising:
   a) rafter bar means;
   b) upright means formed of two pieces adapted to slide longitudinally with respect to each other;
   c) locking means adapted to interconnect and hold said upright means to said rafter bar means when said awning shade is in the furled position; and
   d) a handle operatively mounted on said upright means, the handle including a thumb actuated pushbutton operatively connected to the handle such that depressing the pushbutton unlocks the locking means associated with said upright means, thereby allowing said two pieces of the upright means to slide longitudinally with respect to each other.

16. The awning of claim 15, wherein the pushbutton is flush with the handle when the handle is in a first non-extended position and such that the pushbutton protrudes from the handle when the handle is moved to an extended position.

17. The awning of claim 15, wherein the locking means associated with said upright means further comprises a locking member operatively connected to said pushbutton means such that the locking member moves in a direction away from said upright means when said pushbutton means is depressed, thereby allowing said two pieces of the upright means to slide longitudinally with respect to each other and such that the locking member moves in a direction toward and engages said upright means when the pushbutton means is released, thereby preventing said two pieces of the upright means from sliding longitudinally with respect to each other.

18. The awning of claim 15, wherein the locking means adapted to interconnect and hold said upright means to said rafter bar means further comprises a locking pin located on said rafter bar means and keeper means slidably connected to said upright means and adapted to engage the locking pin when in a locked position, thereby holding said upright means to said rafter bar means.

19. An awning frame including a shade adapted to be moved between a furled and an unfurled position, the frame comprising:
   a) rafter bar means;
   b) a locking pin mounted on said rafter bar means;
   c) upright means formed of two pieces adapted to slide longitudinally with respect to each other;
   d) locking means associated with said upright means to prevent said two pieces from sliding longitudinally with respect to each other; and
   e) keeper means slidably connected to said upright means and adapted to engage the locking pin when in a locked position, whereby said upright means is interconnected and held to said rafter bar means.

20. The awning frame of claim 19, further comprising a centering means for centering the rafter bar means within the upright means when the shade is in the furled position, thereby assisting the locking pin in engaging the keeper means.

* * * * *